US010527995B1

(12) United States Patent
Kishimoto

(10) Patent No.: US 10,527,995 B1
(45) Date of Patent: Jan. 7, 2020

(54) IMAGE FORMING APPARATUS HAVING ABNORMALITY DETECTION UNIT FOR HUMIDITY SENSOR

(71) Applicant: KYOCERA Document Solutions Inc., Osaka (JP)

(72) Inventor: Mitsuyuki Kishimoto, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 16/443,358

(22) Filed: Jun. 17, 2019

(30) Foreign Application Priority Data

Jun. 25, 2018 (JP) ................................ 2018-120299

(51) Int. Cl.

*G03G 15/00* (2006.01)
*G03G 21/20* (2006.01)
*G05D 22/00* (2006.01)

(52) U.S. Cl.

CPC .......... *G03G 15/55* (2013.01); *G03G 21/203* (2013.01); *G05D 22/00* (2013.01); *B65H 2515/805* (2013.01)

(58) Field of Classification Search

CPC ................ G03G 15/55; G03G 21/203; B65H 2515/805; G01N 2021/8663; F24F 2110/20; G05D 22/00

USPC .......................... 399/9, 18, 44, 97; 236/44 A

See application file for complete search history.

(56) References Cited

U.S. PATENT DOCUMENTS 8,494,384 B2 * 7/2013 Furuya ................. G03G 15/235 399/44
2007/0186650 A1 * 8/2007 Hayakawa ........... G01N 27/121 73/335.05
2009/0297184 A1 * 12/2009 Kubo .................. G01N 27/121 399/44
2014/0292352 A1 * 10/2014 Omoya ................. G03G 15/55 324/601
2019/0187611 A1 * 6/2019 Kawabata .......... G03G 15/0258

FOREIGN PATENT DOCUMENTS

JP 2001-042708 2/2001

* cited by examiner

*Primary Examiner* — Robert B Beatty

(57) ABSTRACT

In an image forming apparatus, a humidity sensor measures a humidity. A fuser fixes a toner image on a paper sheet. A first sheet detecting sensor is arranged in an upstream side of the fuser in a sheet transportation path, and detects passing timings of front and rear ends of the paper sheet. A second sheet detecting sensor is arranged in a downstream side of the fuser in a sheet transportation path, and detects passing timings of front and rear ends of the paper sheet. An anomaly detecting unit detects anomaly of the humidity sensor on the basis of (a) a ratio or difference between a first sheet length based on the passing timings detected by the first sheet detecting sensor and a second sheet length based on the passing timings detected by the second sheet detecting sensor and (b) a measurement value of the humidity sensor.

5 Claims, 3 Drawing Sheets

32 9 31 4 7 5 6 5 1a 1b 1c 1d 25 8 26 3a 3b 3c 3d 2a 2b 2c 2d 27 24 23 22 11 101 21

IMAGE FORMING APPARATUS HAVING ABNORMALITY DETECTION UNIT FOR HUMIDITY SENSOR

CROSS-REFERENCE TO RELATED APPLICATIONS

This application relates to and claims priority rights from Japanese Patent Application No. 2018-120299, filed on Jun. 25, 2018, the entire disclosures of which are hereby incorporated by reference herein.

BACKGROUND

1. Field of the Present Disclosure

The present disclosure relates to an image forming apparatus.

2. Description of the Related Art

An image forming apparatus performs measurement of a temperature and a humidity near a photoconductor in a test mode using temperature and humidity sensors, and determines that anomaly occurs in the temperature and humidity sensors if a combination of measurement values of the temperature and the humidity falls into a predetermined range.

However, the aforementioned image forming apparatus performs the test mode and thereby determines whether anomaly occurs in the temperature and humidity sensors or not, and therefore, it is required for performing the test mode to prohibit printing operation. In addition, in the aforementioned image forming apparatus, when a measurement value of the humidity falls into a fluctuation range corresponding to usual change of its environment, anomaly of the sensors is hardly detected.

SUMMARY

An image forming apparatus according to an aspect of the present disclosure includes a humidity sensor, a fuser, a first sheet detecting sensor, a second sheet detecting sensor, and an anomaly detecting unit. The humidity sensor is configured to measure a humidity. The fuser is configured to fix a toner image on a paper sheet. The first sheet detecting sensor is arranged in an upstream side of the fuser in a sheet transportation path, and is configured to detect passing timings of a front end and a rear end of the paper sheet. The second sheet detecting sensor is arranged in a downstream side of the fuser in a sheet transportation path, and is configured to detect passing timings of a front end and a rear end of the paper sheet. The anomaly detecting unit is configured to detect anomaly of the humidity sensor on the basis of (a) a ratio or difference between a first sheet length based on the passing timings detected by the first sheet detecting sensor and a second sheet length based on the passing timings detected by the second sheet detecting sensor and (b) a measurement value of the humidity sensor.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
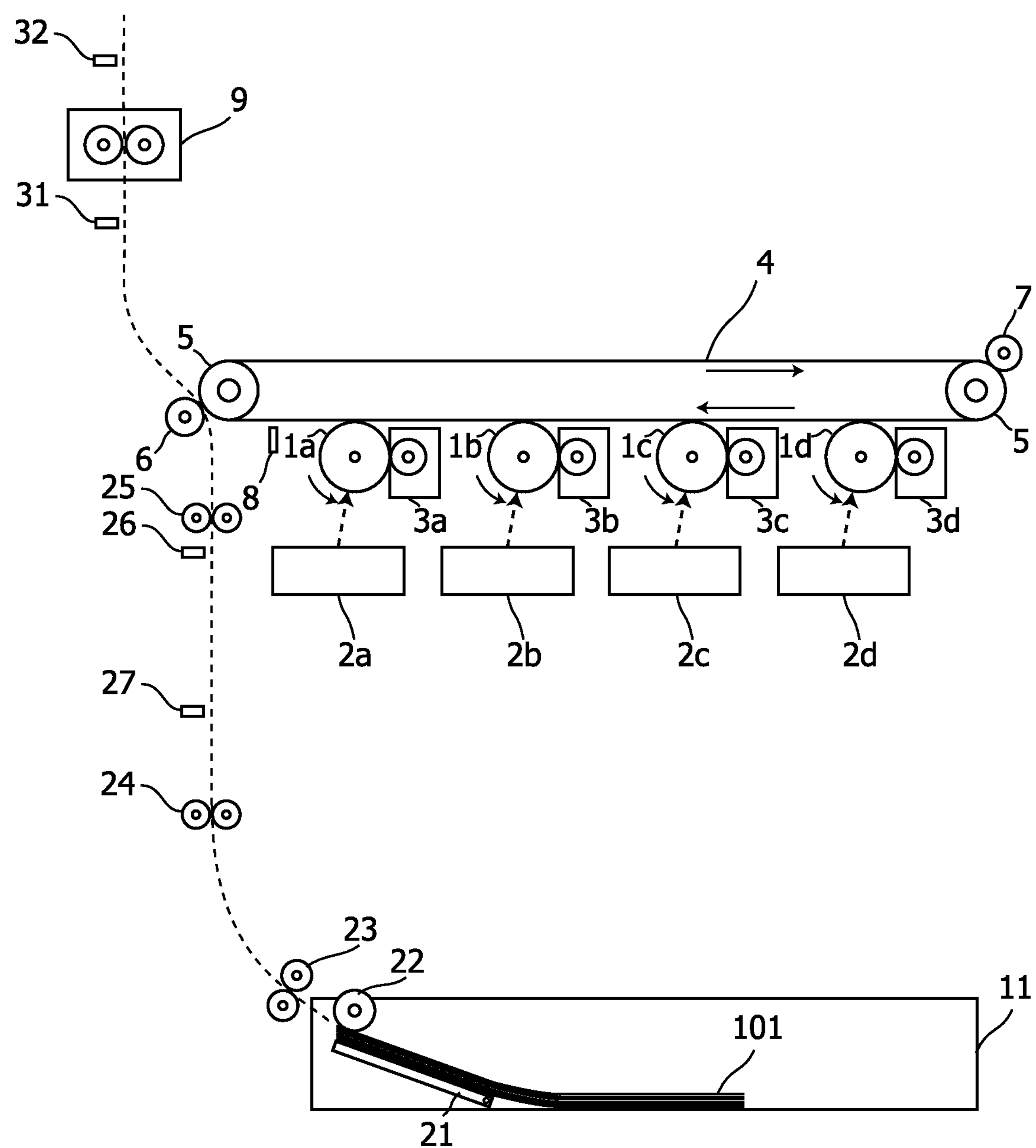
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus shown in FIG. 1 is an apparatus including an electrophotographic printing function, such as a printer, a facsimile machine, a copier or a multi function peripheral.

The image forming apparatus in this embodiment includes a tandem-type color development device. This color development device includes photoconductor drums 1*a* to 1*d*, exposure devices 2*a* to 2*d*, and development units 3*a* to 3*d*. The photoconductor drums 1*a* to 1*d* are photoconductors of four colors: Cyan, Magenta, Yellow and Black.

The exposure devices 2*a* to 2*d* are devices that form electrostatic latent images by scanning and irradiating the photo conductor drums 1*a* to 1*d* with laser light, respectively. The photo conductor drum 1*a*, 1*b*, 1*c* or 1*d* is scanned with the laser light in a direction (a primary scanning direction) perpendicular to a rotation direction (a secondary scanning direction) of the photoconductor drum. The exposure devices 2*a* to 2*d* include laser scanning units that include laser diodes as light sources of the laser light, optical elements (such as lens, mirror and polygon mirror) that guide the laser light to the photoconductor drums 1*a* to 1*d*, respectively.

Further, the periphery of each one of the photo conductor drums 1*a* to 1*d* includes a charging unit such as scorotron, a cleaning device, a static electricity eliminator and the like. The cleaning device removes residual toner on each one of the photo conductor drums 1*a* to 1*d* after primary transfer. The static electricity eliminator eliminates static electricity of each one of the photoconductor drums 1*a* to 1*d* after primary transfer.

The development unit 3*a*, 3*b*, 3*c* or 3*d* includes a toner cartridge and a development device. The toner cartridge contains toner of one of four colors: Cyan, Magenta, Yellow, and Black. The toner is supplied from a toner hopper in the toner cartridge to the development device. The development device adheres the toner on the photoconductor drum 1*a*, 1*b*, 1*c*, or 1*d*. The development unit 3*a*, 3*b*, 3*c*, or 3*d* forms a toner image by adhering the toner to an electrostatic latent image on the photoconductor drum 1*a*, 1*b*, 1*c*, or 1*d*. An unshown toner conveyance unit is driven by a driving device such as a motor and conveys the toner from the toner hopper to the development device.

The photoconductor drum 1*a*, the exposure device 2*a* and the development unit 3*a* perform development of Magenta. The photoconductor drum 1*b*, the exposure device 2*b* and the development unit 3*b* perform development of Cyan. The photoconductor drum 1*c*, the exposure device 2*c* and the development unit 3*c* perform development of Yellow. The photoconductor drum 1*d*, the exposure device 2*d* and the development unit 3*d* perform development of Black.

An intermediate transfer belt 4 is a loop-shaped image carrier (here an intermediate transfer member), and contacts the photoconductor drums 1_a_ to 1_d_. Toner images on the photoconductor drums 1_a_ to 1_d_ are primarily transferred onto the intermediate transfer belt 4. The intermediate transfer belt 4 is hitched around driving rollers 5, and rotates by driving force of the driving rollers 5 towards the direction from the contact position with the photoconductor drum 1_d_ to the contact position with the photoconductor drum 1_a_.

A transfer roller 6 makes an incoming paper sheet contact the transfer belt 4, and secondarily transfers the toner image on the transfer belt 4 to the paper sheet. The paper sheet on which the toner image has been transferred is transported to a fuser 9, and consequently, the toner image is fixed on the paper sheet.

A roller 7 includes a cleaning brush, and removes residual toner on the intermediate transfer belt 4 by the cleaning brush contacting to the intermediate transfer belt after transferring the toner image to the paper sheet and/or after toner density calibration or toner gradation calibration.

A sensor 8 irradiates the intermediate transfer belt 4 with a light beam, and detects its reflection light from a surface of the intermediate transfer belt 4 or a toner pattern on the intermediate transfer belt 4. For example, in toner gradation calibration, the sensor 8 irradiates a predetermined area (an area onto which a toner patch for calibration is transferred) on the intermediate transfer belt 4 with a light beam, detects its reflection light, and outputs an electronic signal corresponding to the received light amount.

The fuser 9 includes a fixing roller, and fixes a toner image on the paper sheet using the fixing roller in a heating and pressurizing manner.

Further, the image forming apparatus of this embodiment includes a sheet cassette 11.

The paper sheet cassette 11 is enabled to be mounted and demounted; in an open status, a user or the like supplies one or plural paper sheets 101 of a specific size into the sheet cassette 11, and in a close status, the sheet cassette 11 pushes up the paper sheet 101 with a lift plate 21 so as to cause the paper sheet 101 to contact to a pickup roller 22. A driving mechanism of the lift plate 21 is configured, for example, to mechanically push up the lift plate 21 by using an action for moving the sheet cassette 11 to the close status. The paper sheets 101 on the sheet cassette 11 are fed to a sheet feeding roller 23 by the pickup roller 22 one by one from the top of a bunch of the paper sheets 101. The sheet feeding roller 23 is a roller that transports to a sheet transportation path the paper sheet 101 one by one fed by the pickup roller 22 from the sheet cassette 11.

A transportation roller 24 is a transportation roller on a sheet transportation path of the paper sheet 101 transported from the sheet cassette 11.

A registration roller 25 temporarily stops the incoming paper sheet on the sheet transportation path and thereafter transports the paper sheet to the transfer roller at a transportation timing adjusted such that a toner image on the intermediate transfer belt 4 is transferred at a specified position on the paper sheet.

A registration sensor 26 is arranged near the registration roller 25, and is a sensor that detects that the paper sheet reaches the registration roller 25.

A sheet detecting sensor 27 is arranged at a predetermined position along a sheet transportation path between the registration sensor 26 and the sheet cassette 11, and is a sensor that detects that the paper sheet transported from the sheet cassette 11 (here, a front end of the paper sheet) passes through the predetermined position. For example, the sheet detecting sensor 27 is an optical sensor. The sheet detecting sensor 27 is used to detect paper sheet jam that occurs in the sheet transportation path.

When the sheet cassette 11 is specified as a paper sheet supply for printing, the rollers 23 and 24 transport a paper sheet 101 to the registration roller 25.

Further, a sheet detecting sensor 31 is arranged in an upstream side of the fuser 9 in the sheet transportation path, and detects passing timings of a front end and a rear end of the paper sheet.

Furthermore, a sheet detecting sensor 32 is arranged in a downstream side of the fuser 9 in the sheet transportation path, and detects passing timings of a front end and a rear end of the paper sheet.

Here the sheet detecting sensors 31 and 32 are optical sensors installed to detect paper sheet jam, and therefore, installation of new sensors is not required other than such sensors that detect paper sheet jam.

Figure 2:
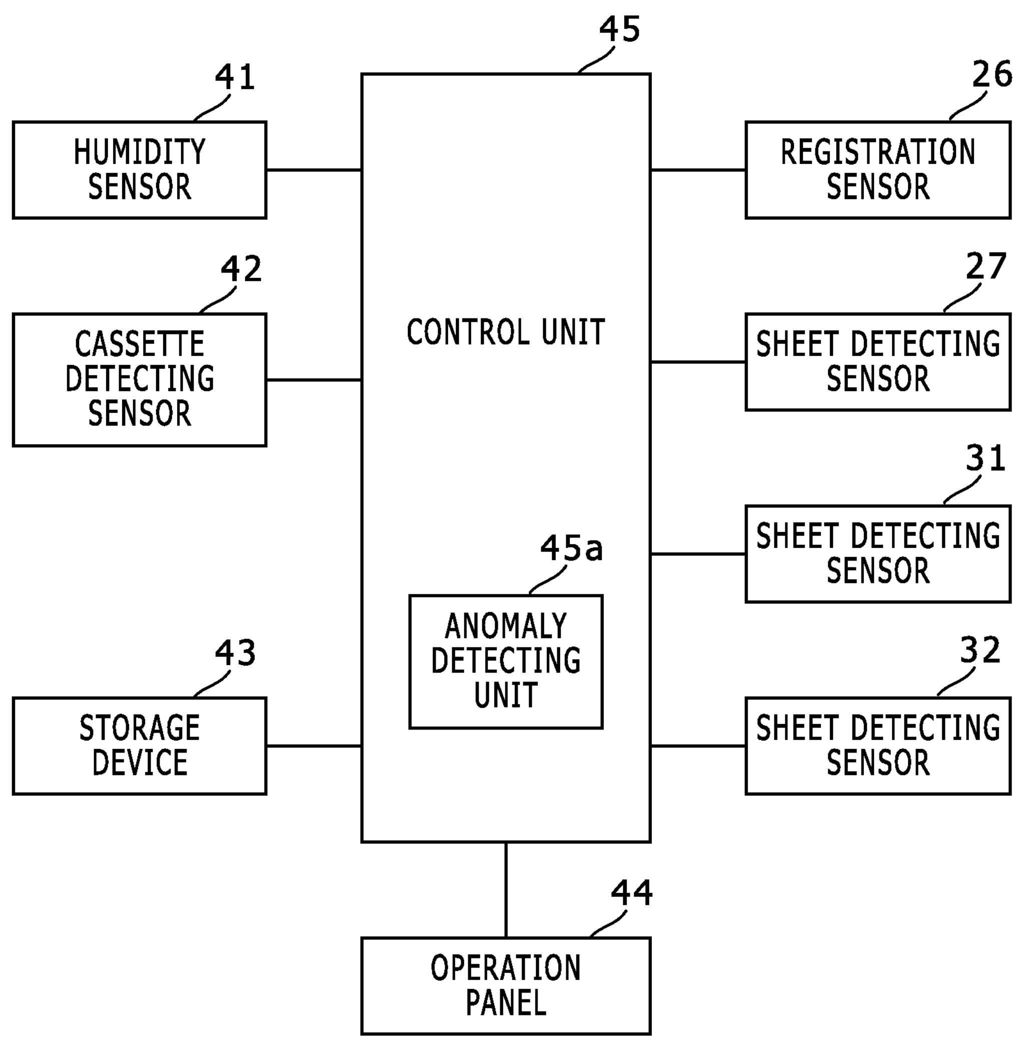
FIG. 2 shows a block diagram that indicates an electronic configuration of the image forming apparatus shown in FIG. 1.

FIG. 2 shows a block diagram that indicates an electronic configuration of the image forming apparatus shown in FIG. 1. As shown in FIG. 2, this image forming apparatus further includes a humidity sensor 41, a cassette detecting sensor 42, a storage device 43, an operation panel 44, and a control unit 45.

The humidity sensor 41 is a sensor that measures a humidity in the inside of this image forming apparatus.

The cassette detecting sensor 42 detects mounting the sheet cassette 11 to a main body of this image forming apparatus and demounting the sheet cassette 11 from the main body.

The storage device 43 is a rewritable nonvolatile storage device such as a flash memory or a hard disk, and stores an anomaly detecting condition mentioned below.

The operation panel 44 includes a display device (a liquid crystal display or the like) that displays sorts of message to a user (inquiries to a user) and an input device (touch panel or the like) that detects a user operation.

The control unit 45 includes a processor that acts in accordance with a control program, an ASIC (Application Specific Integrated Circuit) and/or the like and acts as processing units using the processor, the ASIC and/or the like. The control unit 45 controls a mechanism configured as shown in FIG. 1 and thereby performs a printing process. In this behavior, the control unit 45 adjusts values of parameters in the printing process in accordance with a humidity measured by the humidity sensor 41.

Further, the control unit 45 acts as an anomaly detecting unit 45_a_. The anomaly detecting unit 45_a_ detects anomaly of the humidity sensor 41 on the basis of (a) a ratio or difference between a first sheet length (i.e. sheet length in a secondary scanning direction) based on the passing timings detected by the sheet detecting sensor 31 and a second sheet length based on the passing timings detected by the sheet detecting sensor 32 and (b) a measurement value of the humidity sensor 41 (at a time point that this paper sheet is in transportation).

The first sheet length is calculated as a product of (a) a time length between the passing timings of the front and rear ends detected by the sheet detecting sensor 31 and (b) a known linear velocity of the sheet transportation; and the second sheet length is calculated as a product of (a) a time length between the passing timings of the front and rear ends detected by the sheet detecting sensor 32 and (b) a known linear velocity of the sheet transportation.

The first sheet length changes in accordance with a moisture absorption state of the paper sheet, and the second sheet length gets shorter than the first sheet length because heating in the fuser 9 reduces moisture absorbed in the paper sheet.

Therefore, without switching to the test mode, the anomaly detecting unit 45*a* measures the first and second sheet lengths of a paper sheet passing through the fuser 9 in the printing process, and detects anomaly of the humidity sensor 41 on the basis of a measurement value of the humidity sensor 41 at that time point and measurement values of the first and second sheet lengths.

In this embodiment, the anomaly detecting unit 45*a* repeatedly (for example, every time that a paper sheet passes through the fuser 9 in the printing process, one time per printing job, or the like) (a) measures a combination of the aforementioned first and second sheet lengths and the humidity by the humidity sensor 41, (b) determines a correlation between (b1) a ratio or a difference between the first and the second sheet lengths and (b2) a measurement value of the humidity sensor 41 on the basis of the measured combination, and (c) if the humidity measured by the humidity sensor 41 deviates from the correlation by a predetermined value or more, determines that anomaly occurs in the humidity sensor 41.

Figure 3:
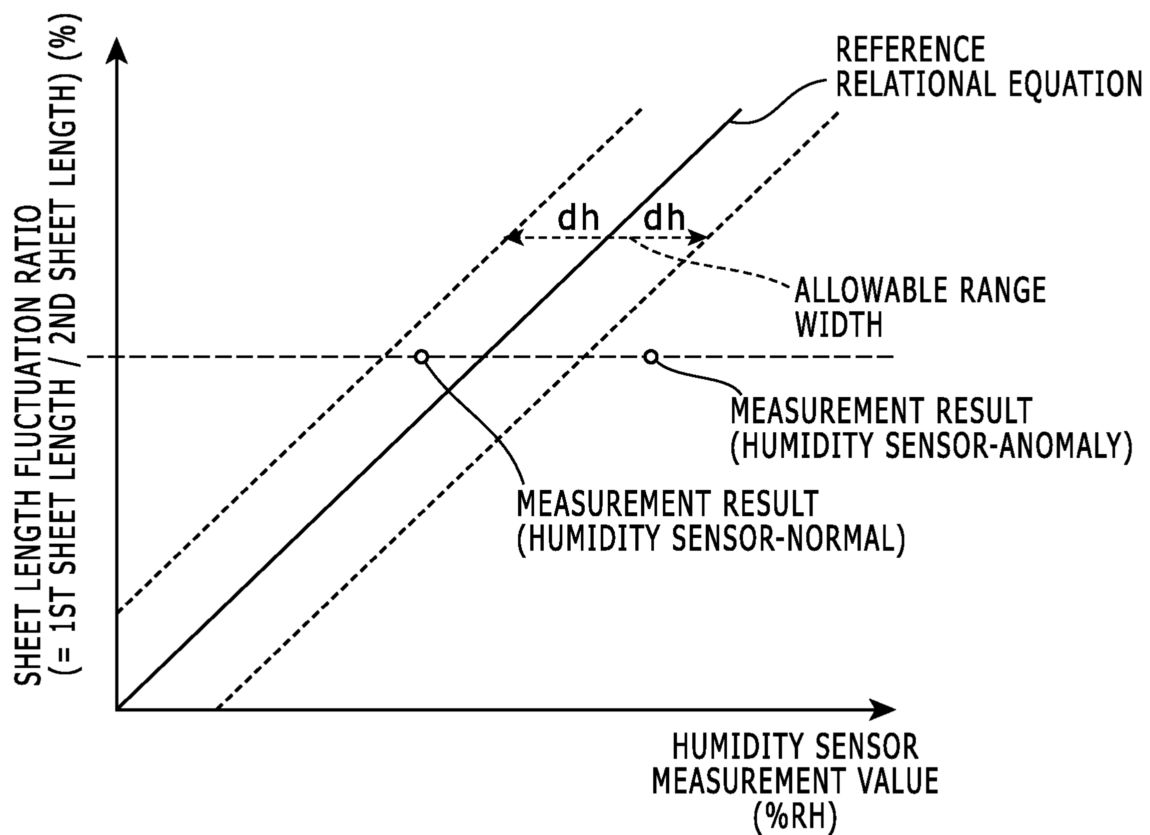
FIG. 3 shows a diagram that explains an anomaly detecting condition of a humidity sensor in the image forming apparatus shown in FIGS. 1 and 2.

FIG. 3 shows a diagram that explains an anomaly detecting condition of the humidity sensor 41 in the image forming apparatus shown in FIGS. 1 and 2. Specifically, the anomaly detecting unit 45*a* measures predetermined times the aforementioned first and second sheet lengths and the humidity and stores the measurement results into the storage device 43, and upon obtaining the measurement results of the plural times, determines a correlation between (a) a ratio or difference between the first and second sheet lengths (as this ratio, sheet length fluctuation ratio is used in FIG. 3) and (b) the humidity using a least squares method or the like, for example, and stores data of a reference relational equation that expresses this correlation as shown in FIG. 3 into the storage device 43. Afterward, the anomaly detecting unit 45 reads the data, and if the humidity measured by the humidity sensor 41 deviates from the aforementioned correlation based on the data at a ratio or difference between the afterward-measured first and second sheet lengths by a predetermined value (allowable range width dh) or more, then the anomaly detecting unit 45 determines that anomaly occurs in the humidity sensor 41.

Further, the anomaly detecting unit 45*a* may (a) measure the first sheet length, the second sheet length and the humidity by the humidity sensor 41 at a time point that mounting or demounting of the sheet cassette 11 (i.e. the sheet cassette that stored the paper sheet of which the first and second sheet lengths were measured) is not detected for a predetermined time nor more by the cassette detecting sensor 42, and (b) detect anomaly of the humidity sensor 41 on the basis of the measured first and second sheet lengths and the measured humidity. If mounting or demounting of the sheet cassette 11 is not detected for a predetermined time nor more by the cassette detecting sensor 42, a paper sheet stored in the sheet cassette 11 absorbs moisture, and therefore, the sheet length is reduced from the first sheet length to the second sheet length due to passing through the fuser 9, and consequently, a ratio or difference between the first and second sheet lengths sufficiently corresponds to the humidity. In such a condition, if mounting and demounting of the sheet cassette 11 has been detected within the predetermined time, a new paper sheet may have been replenished in the sheet cassette and such a new replenished paper sheet may not have sufficiently absorbed moisture; and therefore, in such a case, the anomaly detecting unit 45*a* cancels the anomaly detection of the humidity sensor 41 based on the first and second sheet lengths and the humidity measured by the humidity sensor 41.

In addition, if a sheet type of the paper sheet was changed after a previous measurement of the first and second sheet lengths and the humidity by the humidity sensor 41, the anomaly detecting unit 45*a* may cancel the anomaly detection of the humidity sensor 41 regardless of the first and second sheet lengths and the humidity by the humidity sensor 41.

For example, if anomaly of the humidity sensor 41 is detected in the aforementioned manner on the basis of the first and second sheet lengths and the humidity by the humidity sensor 41, then anomaly detecting unit 45*a* (a) displays on the operation panel 44 to a user a message to inquire whether the sheet type was changed after the previous measurement or not, (b) detects with the operation panel 44 a user operation as an answer to this inquiry, and (c) cancels the anomaly detection of the humidity sensor 41 if the user operation indicates that the sheet type was changed after the previous measurement. If the sheet type was changed, then the anomaly detecting unit 45*a* may (a) remove the measurement results currently stored in the storage device 43, (b) obtain the measurement results of the predetermined times for the changed sheet type again, and (c) store the obtained measurement results into the storage device 43. Otherwise, when the sheet type was changed, the anomaly detecting unit 45*a* may keep the measurement results currently stored in the storage device 43 as the measurement results corresponding to the previous sheet type without removing them, and if the sheet type is changed back to the previous one, the anomaly detecting unit 45*a* may detect anomaly of the humidity sensor 41 using the measurement results for the previous sheet type stored in the storage device 43.

The following part explains a behavior of the aforementioned image forming apparatus.

When the aforementioned plural times of the measurement have not been finished yet, the anomaly detecting unit 45*a* measures the aforementioned first and second sheet lengths and the humidity by the humidity sensor 41, for example, for every paper sheet in the printing process, and stores the measurement results (i.e. a combination of the first sheet length, the second sheet length and a measurement value of the humidity) into the storage device 43.

When the aforementioned plural times of the measurement have been finished, the anomaly detecting unit 45*a* derives a correlation between a ratio or difference between the first and second sheet lengths and the humidity measurement value of the humidity sensor 41, and stores into the storage device 43 data of a reference relational equation that express the correlation.

Afterward, the anomaly detecting unit 45*a* reads the data of the reference relational equation that indicates the correlation, and (a) measures the aforementioned first and second sheet lengths and the humidity by the humidity sensor 41, for example, for every paper sheet in the printing process, (b) determines whether the humidity by the humidity sensor 41 deviates from a range that has an allowable range width dh from the correlation (i.e. an allowable range) or not, and (c) if the humidity by the humidity sensor 41 does not deviate from the allowable range, determines that the humidity sensor 41 is in a normal status and if the humidity by the humidity sensor 41 deviates from the allowable range, determines that the humidity sensor 41 is in an anomaly status. If the anomaly of the humidity sensor 41 is detected, then a user is notified of the anomaly of the humidity sensor 41, the printing process is prohibited, and/or the like, for example.

As mentioned, in the aforementioned embodiment, the sheet detecting sensor 31 is arranged in an upstream side of the fuser 9 in the sheet transportation path, and detects passing timings of a front end and a rear end of the paper sheet. The sheet detecting sensor 32 is arranged in a downstream side of the fuser 9 in the sheet transportation path, and detects passing timings of a front end and a rear end of the paper sheet. The anomaly detecting unit 45*a* detects anomaly of the humidity sensor 41 on the basis of (a) a ratio or difference between a first sheet length based on the passing timings detected by the sheet detecting sensor 31 and a second sheet length based on the passing timings detected by the sheet detecting sensor 32 and (b) a measurement value of the humidity sensor 41.

Consequently, since a ratio or difference between the sheet lengths before and after the fixation fluctuates in accordance with apparatus inside humidity, and referring to the ratio or the difference, anomaly of the humidity sensor 41 is properly detected.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, when the anomaly of the humidity sensor 41 is detected, a humidity may be determined from a ratio or difference between the first and second sheet lengths using a predetermined conversion table or a predetermined relational equation, and the determined humidity may be used instead of a measurement value of the humidity sensor 41.

Further, in the aforementioned embodiment, the anomaly detecting unit 45*a* may (a) select among plural anomaly detecting conditions (i.e. the respective aforementioned reference relational equations of the correlations and the respective allowable range widths dh corresponding to the plural sheet types) corresponding to plural sheet types (e.g. sheet thicknesses or the like) an anomaly detecting condition corresponding to the paper sheet of which the first and second sheet length were measured, and (b) detect anomaly of the humidity sensor 41 in accordance with the selected anomaly detecting condition.

Furthermore, in the aforementioned embodiment, the correlation is determined after the plural times of the measurement and then anomaly of the humidity sensor 41 is detected on the basis of the determined correlation. Alternatively, until the plural times of the measurement are finished, anomaly of the humidity sensor 41 may be detected using a default correlation.

What is claimed is:

1. An image forming apparatus, comprising:

a humidity sensor configured to measure a humidity;

a fuser configured to fix a toner image on a paper sheet;

a first sheet detecting sensor arranged in an upstream side of the fuser in a sheet transportation path, and configured to detect passing timings of a front end and a rear end of the paper sheet;

a second sheet detecting sensor arranged in an downstream side of the fuser in a sheet transportation path, and configured to detect passing timings of a front end and a rear end of the paper sheet; and an anomaly detecting unit configured to detect anomaly of the humidity sensor on the basis of (a) a ratio or difference between a first sheet length based on the passing timings detected by the first sheet detecting sensor and a second sheet length based on the passing timings detected by the second sheet detecting sensor and (b) a measurement value of the humidity sensor.

2. The image forming apparatus according to claim 1, wherein the anomaly detecting unit repeatedly (a) measures a combination of the first sheet length, the second sheet length and the humidity, (b) determines a correlation between (b1) a ratio or difference between the first and second sheet lengths and (b2) a measurement value of the humidity sensor on the basis of the measured combination, and (c) if the humidity measured by the humidity sensor deviates from the correlation by a predetermined value or more, determines that anomaly occurs in the humidity sensor.

3. The image forming apparatus according to claim 1, further comprising:

a sheet cassette configured to store the paper sheet; and a cassette detecting sensor configured to detect mounting the sheet cassette to an image forming apparatus main body and demounting the sheet cassette from the image forming apparatus main body;

wherein the anomaly detecting unit (a) measures the first sheet length, the second sheet length and the humidity at a time point that mounting or demounting of the sheet cassette is not detected for a predetermined time or more by the cassette detecting sensor, and (b) detects anomaly of the humidity sensor on the basis of the measured first and second sheet lengths and a measurement value of the humidity sensor.

4. The image forming apparatus according to claim 1, wherein the anomaly detecting unit cancels the anomaly detection of the humidity sensor if a sheet type of the paper sheet was changed after a previous measurement of the first and second sheet lengths and the humidity.

5. The image forming apparatus according to claim 1, wherein the anomaly detecting unit (a) selects among plural anomaly detecting conditions corresponding to plural sheet types an anomaly detecting condition corresponding to a sheet type of the paper sheet of which the first and second sheet lengths are measured, and (b) detects anomaly of the humidity sensor in accordance with the selected anomaly detecting condition.

* * * * *